C. R. HARTMAN.
Subsoil Plow.
No. 3,076. Reissued Aug. 11, 1868.
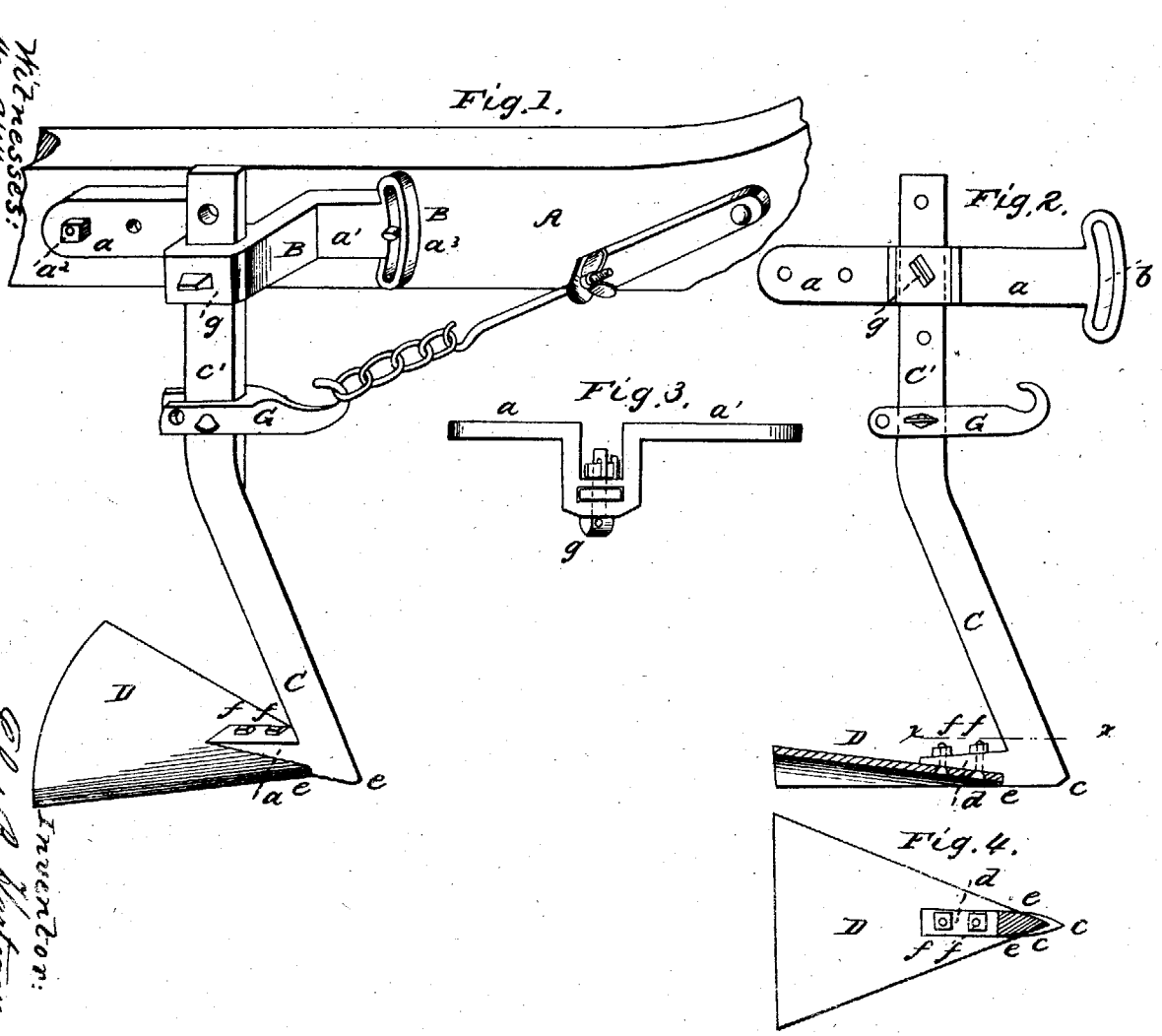
Witnesses:
Wm. A. Morgan
G. C. Colton
Inventor:
Chas. R. Hartman
per Munn & Co
Attorneys

UNITED STATES PATENT OFFICE.

CHARLES R. HARTMAN, OF VINCENNES, INDIANA.

IMPROVEMENT IN SUBSOIL-PLOWS.

Specification forming part of Letters Patent No. 76,627, dated April 14, 1868; Reissue No. 3,076, dated August 11, 1868.

*To all whom it may concern:*

Be it known that I, CHARLES R. HARTMAN, of Vincennes, in the county of Knox and State of Indiana, have invented a new and Improved Adjustable Subsoil Attachment for Plows; and I do hereby declare that the following is a full, clear, and exact description thereof, reference being had to the accompanying drawings, making a part of this specification, in which—

Figure 1 is a perspective view of the improved subsoil device. Fig. 2 is a side view of the same. Fig. 3 is a top view; and Fig. 4 is a horizontal section through the colter, taken at the point indicated by red line *x x* in Fig. 2.

Similar letters of reference indicate corresponding parts in the several figures.

This invention relates to a new and improved implement which is adapted for being secured to a common plow-beam in rear of a turn-plow, and which is designed for running in the furrow made by the plow and throwing up and loosening the subsoil. It is also adapted for use separately from the turn-plow in various ways.

It consists in a colter having its lower portion sharpened and bent forward of the line of its upper portion or standard, and otherwise so constructed as not to be readily impeded in its passage through the soil by roots and other obstructions, said colter being provided with an extension formed on its heel in such a manner as not to prevent the free passage of the same through the soil, to which a concavo-convex shovel or any other suitably-formed knife, sickle, or scraper may be secured, so as not to offer obstructing projections which would prevent the earth from scouring the same and keeping the surface smooth.

It also consists in an adjustable connection of the said colter to the beam whereby it is vertically and adjustably arranged.

It also consists in the combination, with the same, of an adjustable means of connecting the lower portion of the supporting-standard with the beam.

To enable others skilled in the art to understand my invention, I will describe its construction and operation.

In the accompanying drawings, A represents a portion of a common plow-beam, to one side of which the colter and its standard are applied by means of a guide-box, B, from which project two wings, *a a′*, one of which is secured to a beam, A, by means of a pivot-pin, $a^2$, and the other wing is secured by means of a bolt, $a^3$, which passes transversely through a slot, *b*, made through this wing. This slot is concentric to the pin $a^2$, so that when the bolt $a^3$ is loosened the colter and its standard can be adjusted in the arc of a circle and set to run at any desired pitch or inclination with respect to the plow-beam.

The colter or cutter C is formed on a standard, C′, and bent forward at an obtuse angle, as shown in Figs. 1 and 2, so as to make a draw or shear cut and allow roots and other objects which it does not cut through to slide upward, and thus escape without offering any serious obstructions. The point of the colter C is rounded, as shown at *c*, for allowing roots and other objects which are too deeply seated in the soil to pass upward to escape beneath the lower end of the colter. The heel of this colter is extended backward and tapered, as shown at *d*, and this rear extension is arranged slightly above the sole of the colter, so as to leave an abutment or shoulder at *e*, against which the point of the shovel D abuts, and is confined in place by means of bolts *f f*, as shown in Figs. 1 and 2. The bolts *f* are inserted from the bottom side of the shovel D, through this shovel and the colter-extension *d*, and they receive the nuts on their upper ends. The heads of the nuts being countersunk into the sole of the shovel, and the nuts being located directly in rear of the colter C, it will be seen that there will be no projection offered which would obstruct the free passage of the shovel through the earth. Consequently the upper and lower surfaces of the shovel will be scoured and kept perfectly smooth by the earth.

The shovel D is a triangular plate with a convex upper surface and a concave sole. Its front pointed end abuts snugly against the shoulder *e*, and its converging edges are sharpened. The point of this shovel is arranged slightly above the point of the colter, so that while this colter will pass freely through the subsoil and loosen it the sharp edge of the inclined colter C will cut or move out of the way any and all roots and other objects which might break or otherwise injure the thin blade or shovel D.

The standard portion C′ of the colter C is made rectangular in cross-section and passed through its adjustable-guide B upon the plow-beam A, where it is held in position by means of the split bolt and spring-key *g*. Several holes being made through the standard C′, they will allow this standard and its colter to be adjusted vertically, and secured at any desired point, according to the depth it is desired to run the shovel.

Below the guide-box B, and pivoted to the standard C′ at its junction with the colter C, is a hook, G, which may be provided with one or more holes through its shank for setting it forward or backward, as occasion requires. This hook G is designed to afford an attachment for a short chain, (not shown in the drawings,) which in practice will be attached to the beam of a plow for the purpose of resisting backward strain upon the subsoiler. The chain will be shortened or lengthened, according to the pitch given to the standard and colter.

Instead of using a key-bolt, *g*, to secure the standard C′ to the guide-box B, a clamp-screw (thumb-screw) may be used in its stead, in which case the standard should have notches made in its front edge to receive a tooth cast upon the inside of the said guide-box. The screw will be tapped through the back of the box B, so as to abut against the rear edge of the standard.

The colter may with great facility be separated from a subsoil-plow and provided with a beam and used in various useful ways, having shovels of various forms secured to it—as, for instance, I use it in combination with a knife for a nursery plant-digger, or it may be used with the shovel herein described to follow the breaking-plow, being drawn by one horse.

For old ground which is clear of roots and stones I prefer the colter attached to the rear of the shovel, the part in advance of the shoulder *e* projecting through a slot in the shovel, and for rocky ground I provide the colter with a flat point, which may be sharpened and set again after it has been worn.

A colter such as described may with advantage be placed on the market and sold separately from the subsoil-plow, to be attached to any suitable beam, and supplied with any suitable shovel as may be required for the particular kind of work to be done; or it may be provided with a set of several different kinds of shovels, as described, and sold together.

By the use of an adjustable means of connecting it by the hook G to the beam the necessity for the use of a clevis is obviated, for the angle of pitch of the same will determine to better advantage the depth of the draft of the shovel than can be done by a clevis.

Having thus described my invention, what I claim as new, and desire to secure by Letters Patent, is—

1. A colter constructed as described and provided with the standard C′ and the rear projection *d*, as a new article of manufacture, substantially as and for the purpose described.

2. The combination, with the colter and its standard C′, of the adjustable guide-box *a*, substantially as and for the purpose described.

3. The combination, with the hooks G and beam A, of a chain or other suitable bracing-support having an adjustable connection either with the hooks or beam, substantially as and for the purpose described.

CHARLES R. HARTMAN.

Witnesses:

AQUILLA P. WOODALL,
C. W. ALMY.